(12) United States Patent
Sood et al.

(10) Patent No.: US 7,787,627 B2
(45) Date of Patent: Aug. 31, 2010

(54) METHODS AND APPARATUS FOR PROVIDING A KEY MANAGEMENT SYSTEM FOR WIRELESS COMMUNICATION NETWORKS

(75) Inventors: Kapil Sood, Beaverton, OR (US); Jesse Walker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1309 days.

(21) Appl. No.: 11/291,705

(22) Filed: Nov. 30, 2005

(65) Prior Publication Data

US 2007/0121947 A1      May 31, 2007

(51) Int. Cl.
*H04L 9/00*      (2006.01)
*H04K 1/00*      (2006.01)

(52) U.S. Cl. ............................... 380/277; 380/270
(58) Field of Classification Search ............. 380/248, 380/270, 277, 45, 247; 713/168
See application file for complete search history.

(56) References Cited

U.S. PATENT DOCUMENTS 7,263,357 B2 *   8/2007   Lee et al. ............... 455/432.1

| | | |
|---|---|---|
| 2005/0032506 A1 | 2/2005 | Walker |
| 2005/0138377 A1 | 6/2005 | First et al. |
| 2007/0110009 A1 * | 5/2007 | Bachmann et al. ......... 370/338 |
| 2007/0189249 A1 * | 8/2007 | Gurevich et al. ........... 370/338 |

OTHER PUBLICATIONS

Jesse R. Walker, "Technique to Establish Wireless Session Keys Suitable for Roaming", U.S. Appl. No. 09/675,262, filed Sep. 28, 2000.
Kapil Sood, et al., "Communications Security", U.S. Appl. No. 11/090,822, filed Mar. 24, 2005.
Kapil Sood, et al., "A Method to Cryptographically Bind Reservation and Commit Transaction . . . ", U.S. Appl. No. 11/171/867, filed Jun. 30, 2005.
Emily H. Qi, et al., "Techniques to Manage Roaming", U.S. Appl. No. 11/096,392, filed Mar. 31, 2005.

* cited by examiner

*Primary Examiner*—Matthew B Smithers
*Assistant Examiner*—Ali S Abyaneh
(74) *Attorney, Agent, or Firm*—Schwabe, Williamson & Wyatt, P.C.

(57) ABSTRACT

Embodiments of methods and apparatus for providing a key management system for wireless communication networks are generally described herein. Other embodiments may be described and claimed.

19 Claims, 6 Drawing Sheets

METHODS AND APPARATUS FOR PROVIDING A KEY MANAGEMENT SYSTEM FOR WIRELESS COMMUNICATION NETWORKS

TECHNICAL FIELD

The present disclosure relates generally to wireless communication systems, and more particularly, to methods and apparatus for providing a key management system for wireless communication networks.

BACKGROUND

As wireless communication becomes more and more popular at offices, homes, schools, etc., subscribers may roam from one coverage area to another while using time-sensitive applications such as a voice over Internet Protocol (VoIP) application. Further, protection of traffic via wireless links during such applications is critical to ensure the security of wireless environments. Without such protection, wireless communication networks may be susceptible to security threats to delay communication of time-sensitive information. For example, time-sensitive information may include emergency, health, and/or financial transaction information.

DETAILED DESCRIPTION

In general, methods and apparatus for providing a key management system for wireless communication networks are described herein. The methods and apparatus described herein are not limited in this regard.

Figure 1:
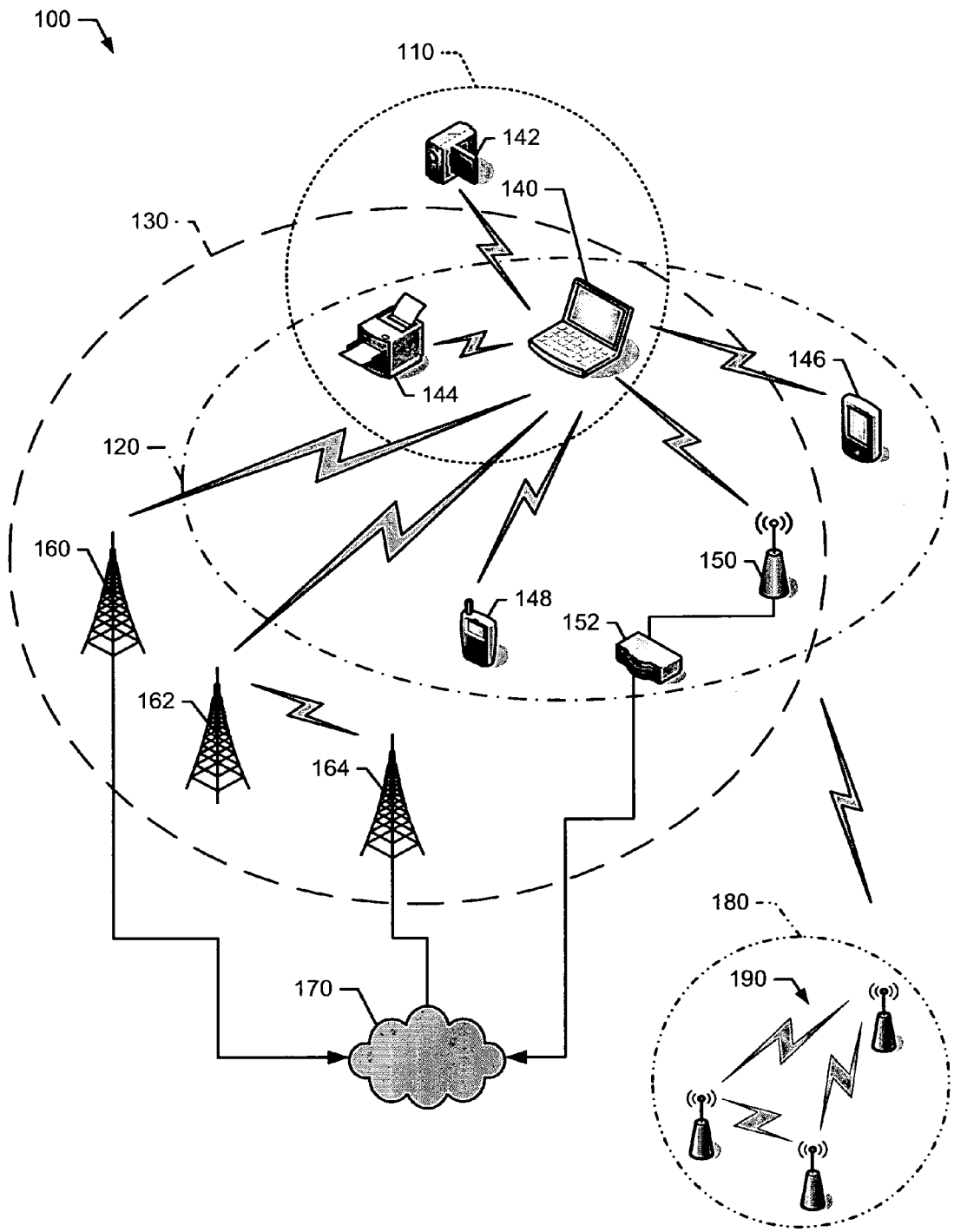
FIG. 1 is a schematic diagram representation of an example wireless communication system according to an embodiment of the methods and apparatus disclosed herein.

Referring to FIG. 1, an example wireless communication system 100 may include one or more wireless communication networks, generally shown as 110, 120, and 130. In particular, the wireless communication system 100 may include a wireless personal area network (WPAN) 110, a wireless local area network (WLAN) 120, and a wireless metropolitan area network (WMAN) 130. Although FIG. 1 depicts three wireless communication networks, the wireless communication system 100 may include additional or fewer wireless communication networks. For example, the wireless communication networks 100 may include additional WPANs, WLANs, and/or WMANs. The methods and apparatus described herein are not limited in this regard.

The wireless communication system 100 may also include one or more subscriber stations, generally shown as 140, 142, 144, 146, and 148. For example, the subscriber stations 140, 142, 144, 146, and 148 may include wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices. Although FIG. 1 depicts five subscriber stations, the wireless communication system 100 may include more or less subscriber stations.

The subscriber stations 140, 142, 144, 146, and 148 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate via wireless links. In one example, the laptop computer 140 may operate in accordance with suitable wireless communication protocols that require very low power such as Bluetooth®, ultra-wide band (UWB), and/or radio frequency identification (RFID) to implement the WPAN 110. In particular, the laptop computer 140 may communicate with devices associated with the WPAN 110 such as the video camera 142 and/or the printer 144 via wireless links.

In another example, the laptop computer 140 may use direct sequence spread spectrum (DSSS) modulation and/or frequency hopping spread spectrum (FHSS) modulation to implement the WLAN 120 (e.g., a basic service set (BSS) network in accordance with the 802.11 family of standards developed by the Institute of Electrical and Electronic Engineers (IEEE) and/or variations and evolutions of these standards). For example, the laptop computer 140 may communicate with devices associated with the WLAN 120 such as the printer 144, the handheld computer 146 and/or the smart phone 148 via wireless links. The laptop computer 140 may also communicate with an access point (AP) 150 via a wireless link. The AP 150 may be operatively coupled to a router 152 as described in further detail below. Alternatively, the AP 150 and the router 152 may be integrated into a single device (e.g., a wireless router).

The laptop computer 140 may use OFDM modulation to transmit large amounts of digital data by splitting a radio frequency signal into multiple small sub-signals, which in turn, are transmitted simultaneously at different frequencies. In particular, the laptop computer 140 may use OFDM modulation to implement the WMAN 130. For example, the laptop computer 140 may operate in accordance with the 802.16 family of standards developed by IEEE to provide for fixed, portable, and/or mobile broadband wireless access (BWA) networks (e.g., the IEEE std. 802.16, published 2004) to communicate with base stations, generally shown as 160, 162, and 164, via wireless link(s).

Although some of the above examples are described above with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.). The methods and apparatus described herein are not limited in this regard.

The WLAN 120 and WMAN 130 may be operatively coupled to a common public or private network 170 such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc. In one example, the WLAN 120 may be operatively coupled to the common public or private network 170 via the AP 150 and/or the router 152. In another example, the WMAN 130 may be operatively coupled to the common public or private network 170 via the base station(s) 160, 162, and/or 164. The common public or private network 170 may include one or more network servers (not shown).

The wireless communication system 100 may include other suitable wireless communication networks such as wireless mesh networks, generally shown as 180. The AP 150 and/or the base stations 160, 162, and 164 may be associated with one or more wireless mesh networks. In one example, the AP 150 may communicate with and/or operate as one of a plurality of mesh points (MPs) 190 of the wireless mesh network 180. In particular, the AP 150 may receive and/or transmit data in connection with one or more of the plurality of MPs 190. The plurality of MPs 190 may include access points, redistribution points, end points, and/or other suitable connection points for traffic flows via mesh paths. The MPs 160 may use any modulation techniques, wireless communication protocols, and/or wired interfaces described above to communicate.

In another example, the wireless communication system 100 may include a wireless wide area network (WWAN) such as a cellular radio network (not shown). The laptop computer 140 may operate in accordance with other wireless communication protocols to support a WWAN. In particular, these wireless communication protocols may be based on analog, digital, and/or dual-mode communication system technologies such as Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, High-Speed Downlink Packet Access (HSDPA) technology, High-Speed Uplink Packet Access (HSUPA) technology, other suitable generation of wireless access technologies (e.g., 3G, 4G, etc.) standards based on these technologies, variations and evolutions of these standards, and/or other suitable wireless communication standards. Although FIG. 1 depicts a WPAN, a WLAN, and a WMAN, the wireless communication system 100 may include other combinations of WPANs, WLANs, WMANs, and/or WWANs. The methods and apparatus described herein are not limited in this regard.

The wireless communication system 100 may include other WPAN, WLAN, WMAN, and/or WWAN devices (not shown) such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. In addition or alternatively, the subscriber stations 140, 142, 144, 146, and 148, the AP 150, and/or the base stations 160, 162, and 164 may include a serial interface, a parallel interface, a small computer system interface (SCSI), an Ethernet interface, a universal serial bus (USB) interface, a high performance serial bus interface (e.g., IEEE 1394 interface), and/or any other suitable type of wired interface to communicate via wired links. Although certain examples have been described above, the scope of coverage of this disclosure is not limited thereto.

Figure 2:
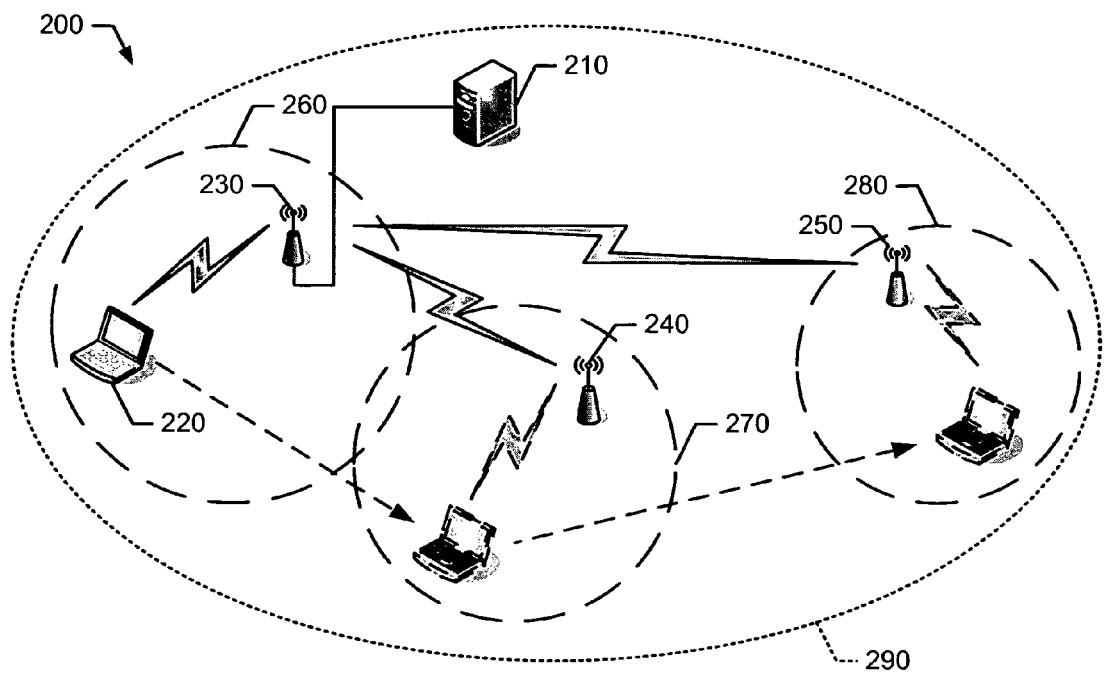
FIG. 2 is a schematic diagram representation of an example key management system.

In the example of FIG. 2, a key management system 200 may include an authentication server (AS) 210, a subscriber station (STA) 220, and two or more access points (APs), generally shown as 230, 240, and 250. Although FIG. 2 depicts three access points, the key management system 200 may include additional or fewer access points. As described in detail below, the subscriber station 220 may roam between coverage areas, generally shown as 260, 270, and 280, within a mobility domain 290. The mobility domain 290 may ensure that boundary within which the key management system 200 may deliver security keys (e.g., authentication and/or session keys) from an initial access point (e.g., the access point 230) to an access point in which the subscriber station 220 may roam into a corresponding coverage area (e.g., the access point 240). The mobility domain 290 may be uniquely identified by a mobility domain identifier (MD-ID), which may be a part of a first-level derived authentication key as described in connection with FIG. 5.

The authentication server 210 may handle requests for network resources. For example, the authentication server 210 may be an authentication, authorization, and accounting (AAA) server. The AAA server may operate in accordance with a protocol based on Remote Authentication Dial-In Service (RADIUS) to provide authentication, authorization, and accounting services such as controlling access to network resources, enforcing policies, auditing usage, providing information to bill for services, etc.

The subscriber station 220 may be a wireless electronic device such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic device.

Each of the access points 230, 240, and 250 may provide communication services to the subscriber station 220 when the subscriber station 220 is within a corresponding coverage area, generally shown as 260, 270, and 280, respectively. The subscriber station 220 may roam from one coverage area to another and receive communication services from one or more of the access points 230, 240, and 250. For example, the access point 230 may provide communication services to the subscriber station 220 when the subscriber station 220 is within the coverage area 260, the access point 240 may provide communication services to the subscriber station 220 when the subscriber station 220 is within the coverage area 270, and the access point 250 may provide communication services to the subscriber station 220 when the subscriber station 220 is within the coverage area 280.

A handoff may occur when the subscriber station 220 transitions from one access point to another. In one example, the access point 230 may initially provide communication services to the subscriber station 220 when the subscriber station 220 is within the coverage area 260. Subsequently, the subscriber station 220 may roam from the coverage area 260 to the coverage area 270 in which the access point 240 may provide communication services to the subscriber station 220 (e.g., the access point 230 may handoff the subscriber station 220 to the access point 240). Further, the subscriber station 220 may roam from the coverage area 270 to the coverage area 280 in which the access point 250 may provide communication services to the subscriber station 220 (e.g., the access point 230 may handoff the subscriber station 220 to the access point 250).

To avoid discontinuing a time-sensitive application during a handoff, the subscriber station 220 may roam from one coverage area to another in a fast manner (e.g., fast roaming). By reducing the non-connectivity time between the subscriber station 220 and the access points 230, 240, and 250 during a handoff, the subscriber station 220 may provide wireless VoIP and/or other time-sensitive applications.

Figure 3:
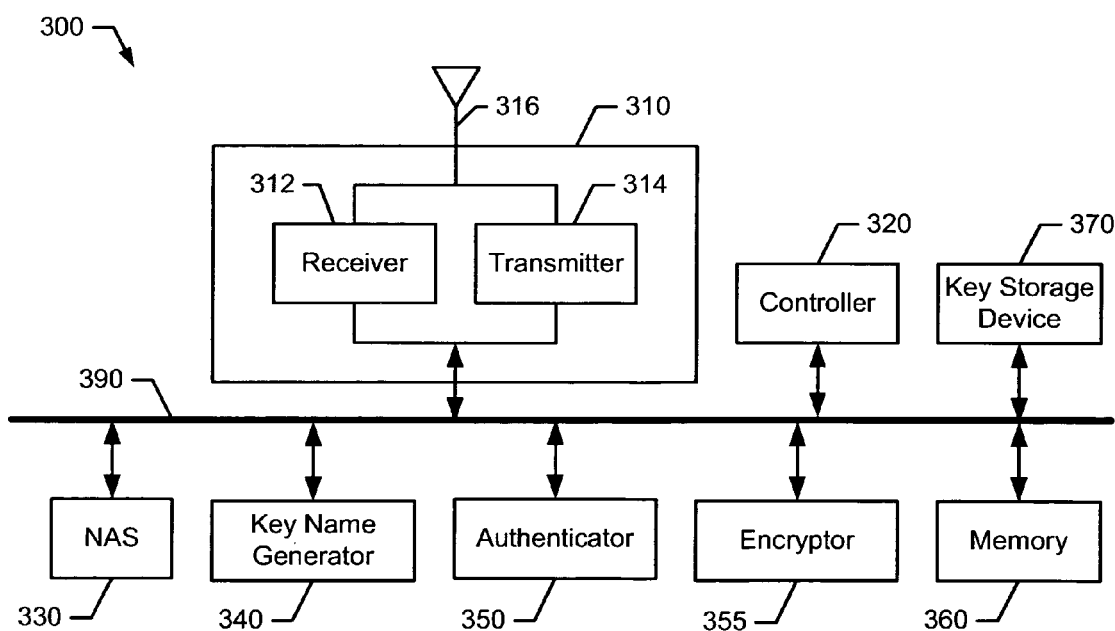
FIG. 3 is a block diagram representation of an example communication node of the key management system of FIG. 2.

In the example of FIG. 3, a communication node 300 (e.g., the AP 230 of FIG. 2) may include a communication interface 310, a controller 320, a network access server (NAS) 330, a key name generator 340, an authenticator 350, an encryptor 355, a memory 360, and a key storage device 370. The communication interface 310, the controller 320, the NAS 330, the key name generator 340, the authenticator 350, the encryptor 355, the memory 360, and/or the key storage device 370 may be operatively coupled to each other via a bus 390. Although FIG. 3 depicts components of the communication node 300 coupling to each other via the bus 390, these components may be operatively coupled to each other via other suitable direct or indirect connections (e.g., a point-to-point connection or a point-to-multiple point connection).

The communication interface 310 may include a receiver 312, a transmitter 314, and an antenna 316. The communication 300 may receive and/or transmit data via the receiver 312 and the transmitter 314, respectively. The antenna 316 may include one or more directional or omni-directional antennas such as dipole antennas, monopole antennas, patch antennas, loop antennas, microstrip antennas, and/or other types of antennas suitable for transmission of radio frequency (RF) signals. Although FIG. 3 depicts a single antenna, the communication node 300 may include additional antennas. For example, the communication node 300 may include a plurality of antennas to implement a multiple-input-multiple-output (MIMO) system.

As described in detail below, the controller 320 may receive authentication keys such as a master authentication key and/or a first-level derived authentication key. In one example, the master authentication key may be generated by the authentication server 210 and the subscriber station 220. The authentication server 210 may also generate the first-level derived authentication key.

The NAS 330 may generate a plurality of second-level derived authentication keys based on the first-level derived authentication key. The NAS 330 may receive the first-level derived authentication key from an authentication server (e.g., the authentication server 210 of FIG. 2). Alternatively, the NAS 330 may generate the first-level derived authentication key locally. In one example, the authentication server 210 may provide the master authentication key to generate the first-level derived authentication key.

The key name generator 340 may generate a key name corresponding to each of the plurality of second-level derived authentication keys. The key name generator 340 may also generate a key name corresponding to the first-level derived authentication key if the NAS 330 generated the first-level derived authentication key locally instead of receiving the first-level derived authentication key from an authentication server. The authenticator 350 may communicate with a subscriber station (e.g., the subscriber station 220 of FIG. 2) to generate a session key for a session between the subscriber station and the communication node 300. The encryptor 355 may encrypt (or securely wrap) one or more of the authentication and/or session keys described above. The memory 360 may store one or more of the authentication and/or session keys described above. Alternatively, the key storage device 370 may store one or more of the authentication and/or session keys described above.

While the components shown in FIG. 3 are depicted as separate blocks within the communication node 300, the functions performed by some of these blocks may be integrated within a single semiconductor circuit or may be implemented using two or more separate integrated circuits. For example, although the receiver 312 and the transmitter 314 are depicted as separate blocks within the communication interface 310, the receiver 312 may be integrated into the transmitter 314 (e.g., a transceiver). In another example, although the controller 320, the NAS 330, the key name generator 340, the authenticator 350 and/or the encryptor 355 are depicted as separate blocks, the controller 320, the NAS 330, the key name generator 340, the authenticator 350, and/or the encryptor 355 may be integrated into a single component. In yet another example, although the memory 360 and the key storage device 370 are depicted as separate blocks, the memory 360 and the key storage device 370 may be integrated into a single component. Further, although the controller 320 and the NAS 330 are depicted within the communication node 300, the controller 320 and/or the NAS 330 may be separate from the communication node 300. The methods and apparatus described herein are not limited in this regard.

As noted above, the subscriber station 220 may roam one coverage area to another coverage area in a fast manner (e.g., fast roaming). In one example, the subscriber station 220 may begin within the coverage area 260 and then roam to the coverage areas 270 and/or 280. In general, the key management system 200 may provide a key hierarchy so that the subscriber station 220 may avoid performing a full authentication process with the authentication server 210 when the subscriber station 220 roams from one coverage area to another within the mobility domain 290. In particular, the key management system 200 may optimize network resources and/or reduce latency by providing a shared authentication key (e.g., the second-level derived authentication keys) between the APs 230, 240, and 250 within the mobility domain 290.

Figure 4:
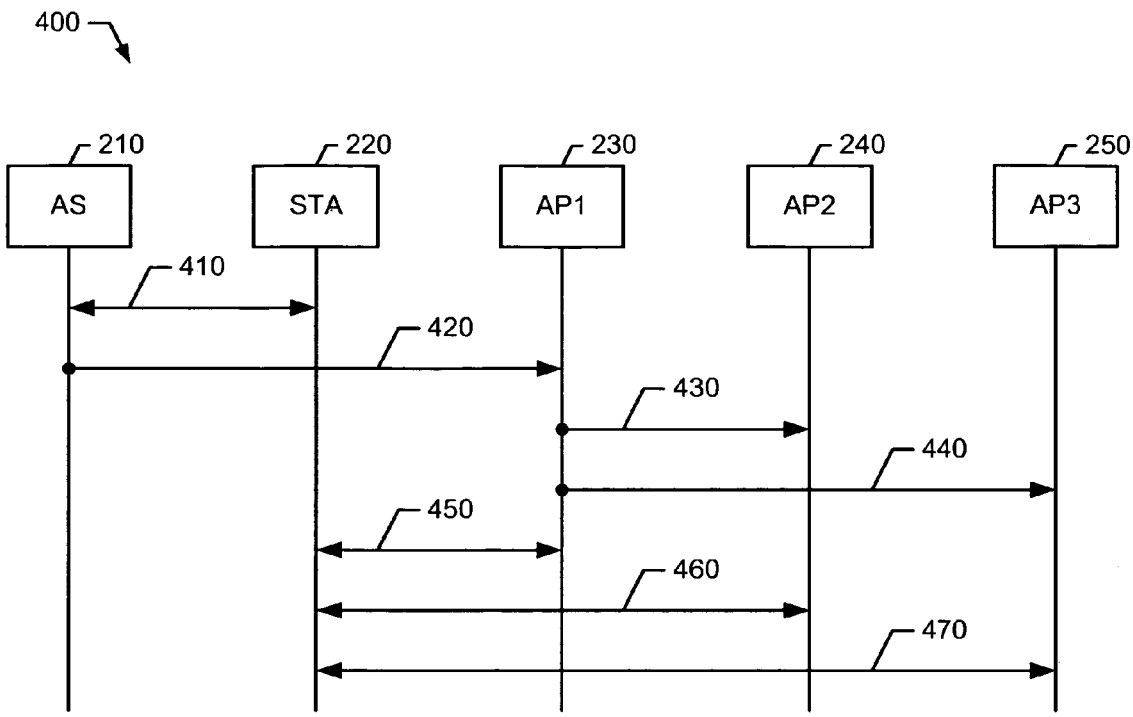
FIG. 4 is a sequence diagram representation of the example key management system of FIG. 2.

The key hierarchy of the key management system 200 may begin with a master secret key (MSK) or a master authentication key. Turning to FIG. 4, for example, the authentication server 210 and the subscriber station 220 (e.g., via a supplicant) may communicate with each other to generate the MSK (e.g., a part of an authentication process) (410). As described in detail below, the MSK may be used to generate a first-level derived authentication key such as, for example, a pairwise master key (PMK). In one example, the PMK may be a 256-bit key derived from an authentication process such as Extensible Authentication Protocol-Transport Layer (EAP-TLS) or Protected EAP (PEAP) 802.1X.

Figure 5:
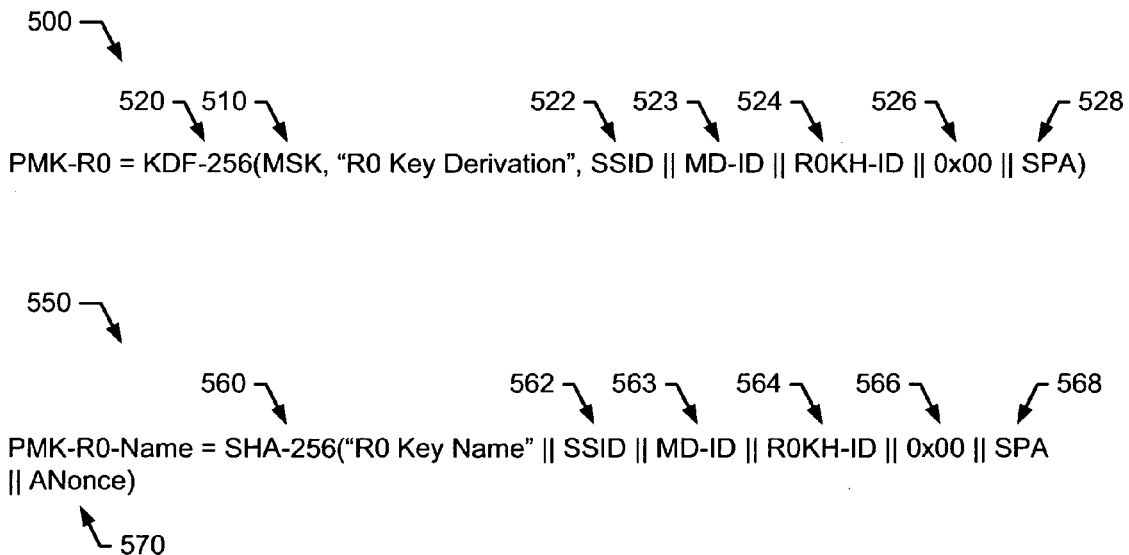
FIG. 5 depicts information elements associated with an example first-level derived authentication key of the key management system of FIG. 2.

Based on the MSK, the authentication server 210 may generate a first-level derived authentication key (e.g., PMK-R0). In the example of FIG. 5, the derivation of PMK-R0 500 may be based on the MSK 510, a key derivation function (KDF) 520, and concatenations of information elements in a service set identifier (SSID) field 522, a mobility domain identifier (MD-ID) field 523, an NAS identifier field 524, a separator field 526, and a sender protocol address (SPA) field 528. For example, the KDF 520 may be a 256-bit KDF (KDF-256) or other suitable KDFs. The SSID field 522 may include a value be defined by the IEEE 802.11 family of standards. The MD-ID field 523 may include an administrative domain name to identify an area within which key-hierarchy keys may be distributed, and the administrative domain name may be provided to a network administrator. The NAS identifier field 524 (e.g., R0KH-ID) may include a value to identify the network entity holding the first-level derived authentication key (e.g., a key holder of R0). In particular, the subscriber station 220 may establish full authentication with the NAS indicated by the NAS identifier field 524 (e.g., the authentication server 210 of FIG. 2). For example, the NAS identifier field 524 may be an Internet Protocol (IP) address or a string octet greater than three (3) octets. The value of the NAS identifier field 524 may be advertised in a beacon, a probe response, or a neighbor report. The separator field 526 (e.g., 0x00) may include a value added after variable length fields to prevent sliding window or parameter attacks on the KDF 520. In one example, the separator field 526 may include a value within a range from 0x00 to 0x7F. The SPA field 528 may include the media access control (MAC) address or other suitable addresses of the subscriber station 220.

In the key management system 200, keys may be named for purposes of debugs, key requests, and/or logs. To securely identify PMK-R0 500, for example, a name for PMK-R0 (PMK-R0-Name) 550 may be generated based on a hash function 560 and concatenation of information elements in an SSID field 562, a MD-ID field 563, an NAS identifier field 564, a separator field 566, a SPA field 568, and a nonce field 570. For example, the hash function 560 may be a 256-bit secure hash algorithm (SHA) (SHA-256) or other suitable SHAs. The SSID field 562 may include a value be defined by the IEEE 802.11 family of standards. The MD-ID field 563 may include a name defined by a network administrator and advertised by one or more access points within a mobility domain (e.g., the mobility domain 290 of FIG. 2). The NAS identifier field 564 (e.g., R0KH-ID) may include a value to identify the key holder of R0 (e.g., the authentication server 210 of FIG. 2). The separator field 566 (e.g., 0x00) may include a value added after variable length fields to prevent sliding window or parameter attacks on the hash function 560. In one example, the separator field 566 may include a value within a range from 0x00 to 0x7F. The SPA field 568 may include the MAC address or other suitable address of the subscriber station 220. The nonce field 570 (e.g., ANonce) may be random value provided by an access point generating the PMK-R0-Name 550 to provide unique key name. In one example, the access point 230 may send the value of the nonce field 570 to the subscriber station 220 to generate a session key (e.g., PTK1) as described below in connection with FIG. 7.

While FIG. 5 depicts particular information elements, the PMK-R0 500 and/or the PMK-R0-Name 550 may include additional or fewer information elements. Further, although particular orders of information elements are illustrated in FIG. 5, these information elements may be arranged in other sequences. The methods and apparatus described herein are not limited in this regard.

Referring back to FIG. 4, the authentication server 210 may encrypt or wrap the first-level derived authentication key and forward the first-level derived authentication key to the access point 230 (420). Alternatively, the authentication server 210 may forward the MSK to the access point 230, which in turn, may generate the first-level derived authentication key.

Based on the first-level derived authentication key, the access point 230 may generate one or more second-level derived authentication keys (e.g., PMK-R1-1, PMK-R1-2, PMK-R1-3, etc.). Each of the second-level derived authentication key may be associated with an access point that may provide communication services to the subscriber station 220 when the subscriber station 220 may roam into a corresponding coverage area. In one example, PMK-R1-1 may be associated with the access point 230, PMK-R1-2 may be associated with the access point 240, and the PMK-R1-3 may be associated with the access point 250. Initially, the access point 230 may generate PMK-R1-1 to establish full authentication with the subscriber station 220. The access point 230 (e.g., via the encryptor 355) may encrypt or securely wrap PMK-R1-2 and PMK-R1-3. Accordingly, the access point 230 may forward the encrypted and/or wrapped PMK-R1-2 and PMK-R1-3 to controllers of the access points 240 and 250 (430 and 440, respectively).

Figure 6:
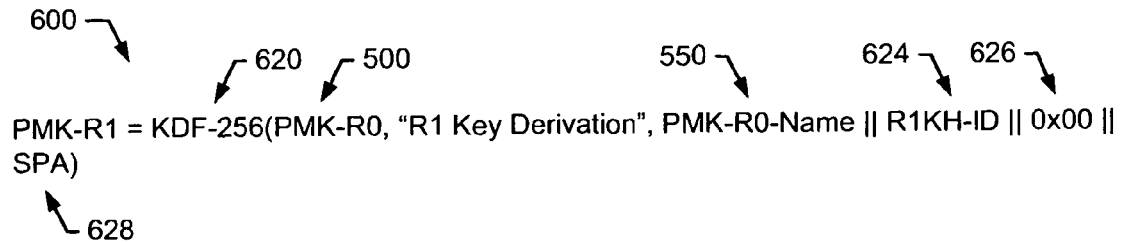
FIG. 6 depicts information elements associated with an example second-level derived authentication key of the key management system of FIG. 2.
Figure 6:
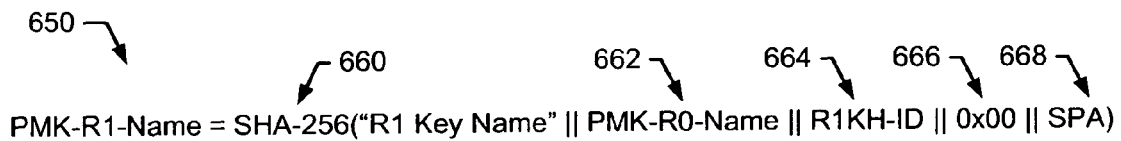

In the example of FIG. 6, for example, the derivation of PMK-R1 600 may be based on a key derivation function (KDF) 620, the PMK-R0 500 of FIG. 5, and concatenations of information elements in the PMK-R0-Name 550 of FIG. 5, an NAS identifier field 624, a separator field 626, and a SPA field 628. For example, the KDF 620 may be a 256-bit KDF (KDF-256) or other suitable KDFs. The NAS identifier field 624 (e.g., R1KH-ID) may include a value to identify the network entity holding the second-level derived authentication key (e.g., a key holder of R1). In particular, the subscriber station 220 may roam to the coverage area of the access point associated with the NAS indicated by the NAS identifier field 624. For example, the NAS identifier field 624 may be an Internet Protocol (IP) address or a string octet greater than three (3) octets. The value of the NAS identifier field 624 may be advertised in a beacon, a probe response, or a neighbor report. The separator field 626 (e.g., 0x00) may include a value added after variable length fields to prevent sliding window or parameter attacks on the KDF 620. In one example, the separator field 626 may include a value within a range from 0x00 to 0x7F. The SPA field 628 may include the MAC address or other suitable address of the subscriber station 220.

To securely identify PMK-R1 600, a name for PMK-R1 650 (e.g., PMK-R1-Name) may be generated based on a hash function 660 and concatenation of information elements in the PMK-R0-Name 550 of FIG. 5, an NAS identifier field 664, a separator field 666, and a SPA field 668. For example, the hash function 660 may be a 256-bit secure hash algorithm (SHA) (SHA-256) or other suitable SHAs. The NAS identifier field 664 (e.g., R1KH-ID) may include a value to identify the key holder of R1. The separator field 666 (e.g., 0x00) may include a value added after variable length fields to prevent sliding window or parameter attacks on the hash function 660. In one example, the separator field 666 may include a value within a range from 0x00 to 0x7F. The SPA field 668 may include the MAC address or other suitable address of the subscriber station 220.

While FIG. 6 depicts particular information elements, the PMK-R1 600 and/or the PMK-R1-Name 650 may include additional or fewer information elements. Further, although a particular order of information elements is illustrated in FIG. 6, these information elements may be arranged in other sequences. The methods and apparatus described herein are not limited in this regard.

To receive communication services within the coverage area 260, the subscriber station 220 may initiate a session with the access point 230. Turning back to FIG. 4, the subscriber station 220 may generate a session key associated with the access point 230. The subscriber station 220 and the access point 230 may mutually derive session keys for the session based on a corresponding second-level derived authentication key (e.g., PMK-R1-1). As described in detail below, for example, the session key may be a pairwise temporal key (PTK) (e.g., PTK1). Accordingly, the subscriber station 220 and the access point 230 may communicate with each other using session keys (450).

As noted above, the subscriber station 220 may roam from the coverage area 260 to the coverage areas 270 and/or 280. In one example, the subscriber station 220 may roam from the coverage area 260 to the coverage area 270. To establish a session for communication services within the coverage area 270, the subscriber station 220 and the access point 240 may generate a session key associated with the access point 240 (e.g., PTK2). In particular, the subscriber station 220 and the access point 240 may mutually generate session keys for the session based on a corresponding second-level derived authentication key (e.g., PMK-R1-2). Accordingly, the subscriber station 220 and the access point 240 may communicate with each other using session keys (460).

In another example, the subscriber station 220 may roam from the coverage area 270 to the coverage area 280. To establish a session for communication services within the coverage area 280, the subscriber station and the access point 250 may generate a session key associated with the access point 250 (PTK3). In a similar manner as noted above, the subscriber station 220 and the access point 250 may mutually generate session keys for the session based on a corresponding second-level derived authentication key (e.g., PMK-R1-3). Accordingly, the subscriber station 220 and the access point 250 may communicate with each other using session keys (470). The methods and apparatus described herein are not limited this regard.

Figure 7:
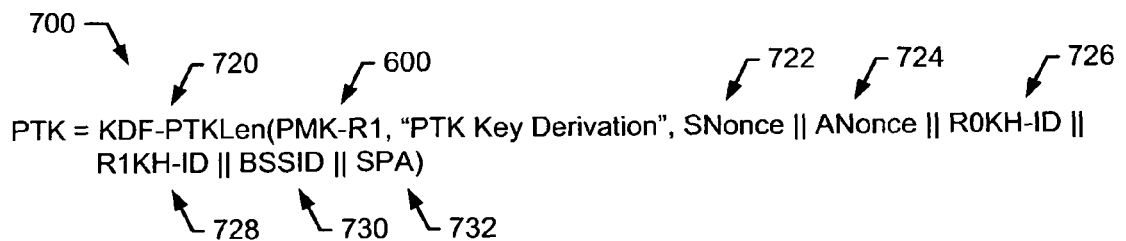
FIG. 7 depicts information elements associated with an example session key of the key management system of FIG. 2.
Figure 7:
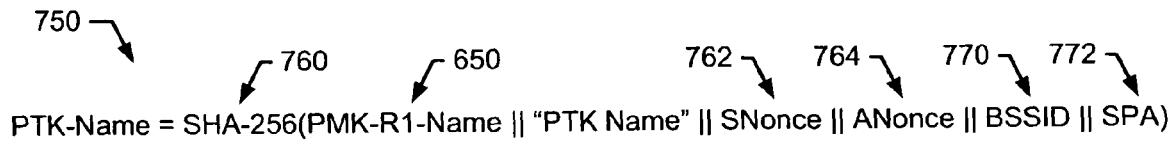

In the example of FIG. 7, for example, the derivation of PTK 700 may be based on a key derivation function (KDF) 720, the PMK-R1 600 of FIG. 6, and concatenations of information elements in a first nonce field 722, a second nonce field 724, a first NAS identifier field 726, a second NAS identifier 728, a basic service set identifier (BSSID) field 730, and a SPA field 732. For example, the KDF 720 may be KDF based on the length of PTK 700 (PTKLen) or other suitable KDFs. In particular, PTKLen may be a total number of bits to derive (e.g., number of bits of the PTK 700). In one example, PTKLen may be based on negotiated cipher suites as defined by IEEE 802.11 family of standards (e.g., the IEEE std. 802.11i, published July 2004). The first nonce field 722 (e.g., SNonce) may be a 256-bit random string or other suitable random numbers generated by the subscriber station 220. The second nonce field 724 (e.g., ANonce) may be a 256-bit random string or other suitable random numbers generated by an access point to communicate with the subscriber station 220 (e.g., the access points 230, 240, or 250). The first NAS identifier field 726 (e.g., R0KH-ID) may include a value to identify the key holder of R0. In particular, the subscriber station 220 may establish full authentication with the NAS indicated by the first NAS identifier field 726. The second NAS identifier field 728 (e.g., R1KH-ID) may include a value to identify the key holder of R1. The subscriber station 220 may roam to the coverage area of the access point associated with the NAS indicated by the second NAS identifier field 728. The BSSID field 730 may include the MAC address of the access point. The SPA field 732 may include the MAC address or other suitable address of the subscriber station 220.

To securely identify PTK 700, a name for PTK (PTK-Name) 750 may be generated based on a hash function 760 and concatenation of information elements in the PMK-R1-Name 650 of FIG. 6, a first nonce field 762, a second nonce field 764, a BSSID field 770, and a SPA field 772. For example, the hash function 760 may be a 256-bit secure hash algorithm (SHA) (SHA-256) or other suitable SHAs. The first nonce field 762 (e.g., SNonce) may be a 256-bit random string or other suitable random numbers generated by the subscriber station 220. The second nonce field 764 (e.g., ANonce) may be a 256-bit random string or other suitable random numbers generated by an access point to communicate with the subscriber station 220 (e.g., the access points 230, 240, or 250). The BSSID field 730 may include the MAC address of the access point. The SPA field 732 may include the MAC address or other suitable address of the subscriber station 220.

While FIG. 7 depicts particular information elements, the PTK 700 and/or the PTK-Name 650 may include additional or fewer information elements. Further, although a particular order of information elements is illustrated in FIG. 7, these information elements may be arranged in other sequences. The methods and apparatus described herein are not limited in this regard.

By deriving authentication and session keys and generating corresponding key names as described above, the key management system 200 may prevent unauthorized parties from receiving and/or using the authentication and/or sessions keys. Further, the authentication and/or session keys may be identified by the corresponding key names for debugging, key requesting, and/or logging purposes. By generating and using a corresponding key name without the authentication or session key itself, the authentication or session key may be identified in a secure manner.

Figure 8:
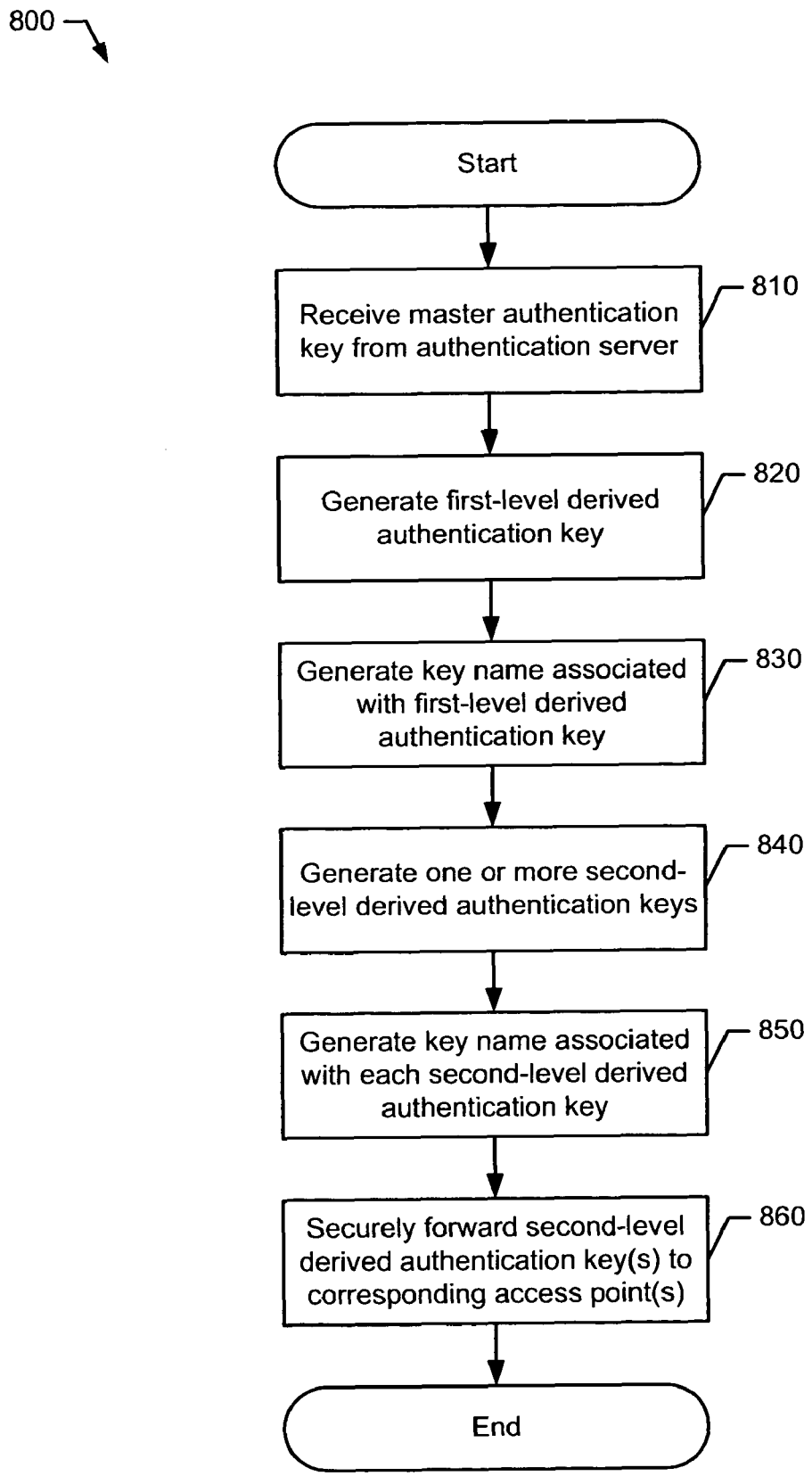
FIG. 8 is a flow diagram representation of one manner to provide a key management system of FIG. 2.

FIG. 8 depicts one manner in which the example communication node of FIG. 3 may be configured to provide a key management system. The example process 800 may be implemented as machine-accessible instructions utilizing any of many different programming codes stored on any combination of machine-accessible media such as a volatile or nonvolatile memory or other mass storage device (e.g., a floppy disk, a CD, and a DVD). For example, the machine-accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium.

Further, although a particular order of actions is illustrated in FIG. 8, these actions can be performed in other temporal sequences. Again, the example process 800 is merely provided and described in conjunction with the apparatus of FIGS. 2 and 3 as an example of one way to configure a communication node to provide a key management system for wireless communication networks.

In the example of FIG. 8, the process 800 may begin with the communication node 300 (e.g., the access point 230 of FIG. 2) receiving a master authentication key from an authentication server (block 810). In one example, the access point 230 may receive an MSK generated by the authentication server 210 and the subscriber station 220 during a mutual authentication process. Based on the MSK, the access point 230 (e.g., via the NAS 330 of FIG. 3) may generate a first-level derived authentication key (e.g., PMK-R0 500 of FIG. 5) (block 820). Accordingly, the access point 230 (e.g., via the key name generator 340 of FIG. 3) may generate a key name associated with the first-level authentication key (e.g., PMK-R0-Name 550 of FIG. 5) (block 830). Alternatively, the authentication server 210 may derive and securely forward the first-level authentication key to the access point 230.

The access point 230 (e.g., via the NAS 330 of FIG. 3) may generate one or more second-level derived authentication keys based on the first-level derived authentication keys (e.g., PMK-R1 600 of FIG. 6) (block 840). As noted above, each of the second-level derived authentication keys may be associated with an access point that may potentially provide communication services to a subscriber station. In one example, the access point 230 (FIG. 2) may generate three second-level derived authentication keys (e.g., PMK-R1-1, PMK-R1-2, and PMK-R1-3) in which PMK-R1-1 may be used by the access point 230, PMK-R1-2 may be used by the access point 240, and PMK-R1-3 may be used by the access point 250. Accordingly, the access point 230 (e.g., via the key name generator 340 of FIG. 3) may generate a key name corresponding to each of the second-level derived authentication keys (e.g., PMK-R1-Name 650 of FIG. 6) (block 850).

The access point 230 (e.g., via the communication interface 310) may securely forward each of the second-level derived authentication keys to a corresponding access point (block 860). For example, the access point 230 may locally store PMK-R1-1 (e.g., the memory 360 and/or the key storage device 370 of FIG. 3) and provide PMK-R1-2 and PMK-R1-3 to controllers corresponding to the access points 240 and 250, respectively. As noted above, the subscriber station 220 may roam from one coverage area to another. In one example, the subscriber station 220 may initially generate a session key for a session with the access point 230 (e.g., via the authenticator 350 of FIG. 3) when the subscriber station 220 is within the coverage area 260. The subscriber station 220 may roam from the coverage area 260 to the coverage area 270. Accordingly, the access point 240 may generate a session key for a session between the subscriber station 220 and the access point 240. Following the above example, the subscriber station 220 may roam from the coverage area 270 to the coverage area 280. Thus, the access point 250 may generate a session key for a session between the subscriber station 220 and the access point 250.

While the methods and apparatus disclosed herein are described in FIG. 8 to operate in a particular manner, the methods and apparatus disclosed herein are readily applicable without certain blocks depicted in FIG. 8. In addition, while FIG. 8 depicts particular blocks, the actions performed by some of these blocks may be integrated within a single block or may be implemented using two or more separate blocks. The methods and apparatus described herein are not limited in this regard.

Although the above examples are described with respect to a two-level key hierarchy, the methods and apparatus disclosed herein may include additional levels of authentication keys. Further, while the above examples are described with respect to access points, the methods and apparatus disclosed herein are readily applicable to communication nodes of many other types of wireless communication networks. For example, the methods and apparatus disclosed herein may be applied to WPANs, WLANs, WMANs, and/or WWANs. In one example, the methods and apparatus disclosed herein may be applicable to base stations. The methods and apparatus described herein are not limited in this regard.

Figure 9:
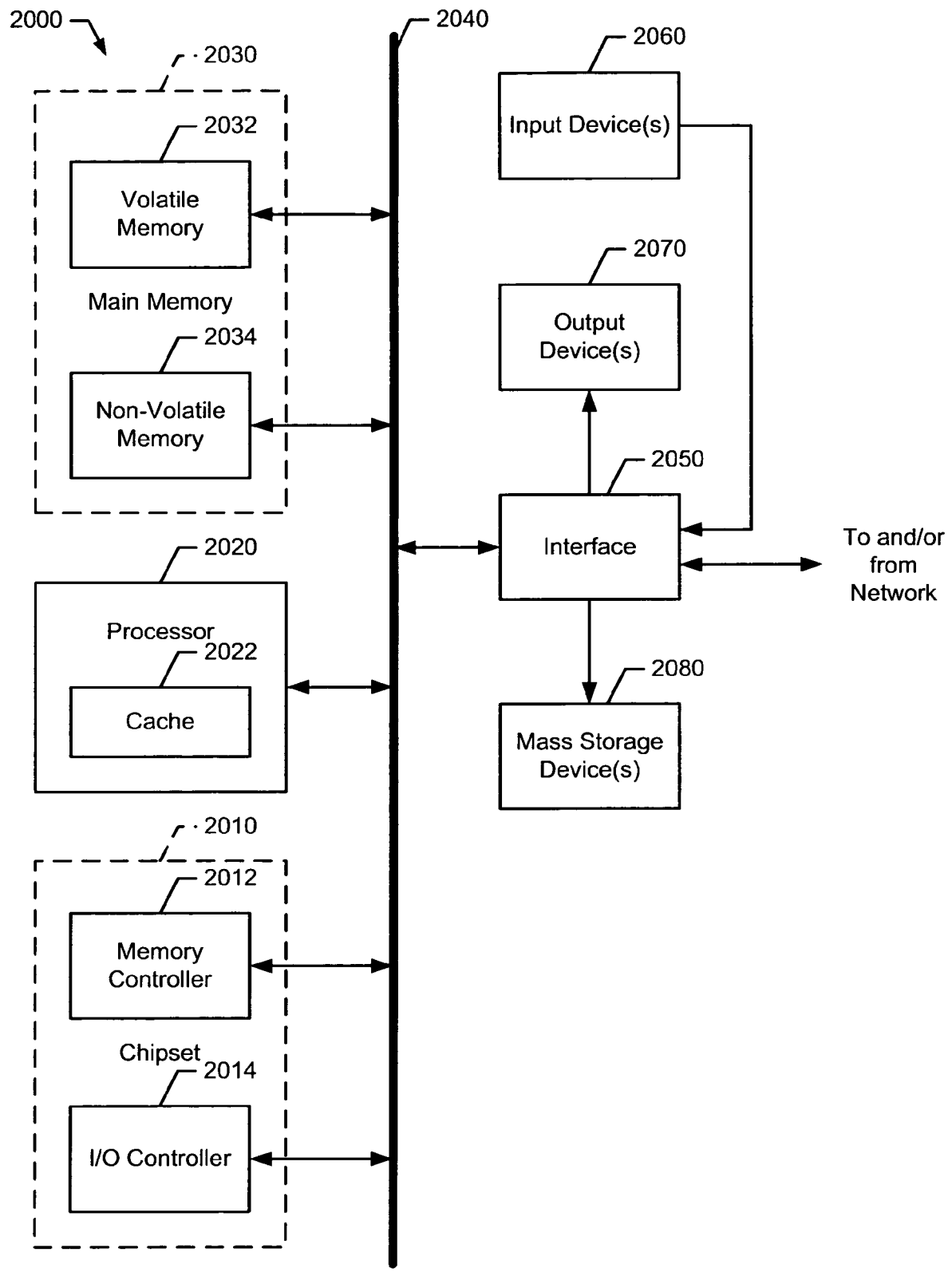
FIG. 9 is a block diagram representation of an example processor system that may be used to implement the example communication node of FIG. 3.

FIG. 9 is a block diagram of an example processor system 2000 adapted to implement the methods and apparatus disclosed herein. The processor system 2000 may be a desktop computer, a laptop computer, a handheld computer, a tablet computer, a PDA, a server, an Internet appliance, and/or any other type of computing device.

The processor system 2000 illustrated in FIG. 9 includes a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WLAN components, WMAN components, WWAN components, and/or other suitable processing components. For example, the processor 2020 may be implemented using one or more of the Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output interface (3GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 9 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:
   receiving, by a first access point (AP), a first-level pairwise master key (PMK), wherein a first key name is associated with the first-level PMK;
   generating, by the first AP, a plurality of second-level derived authentication keys based at least in part on the first-level PMK, the plurality of second-level derived authentication keys including a first second-level PMK, a second second-level PMK, and a third second-level PMK;
   providing, by the first AP, the second second-level PMK and the third second-level PMK to a second AP and a third AP, respectively, to enable the second AP and the third AP to establish communication sessions with a subscriber station using at least in part the second second-level PMK and the third second-level PMK, respectively;
   communicating, by the first AP, with a subscriber station to generate one or more session keys based on the first second-level PMK, wherein the one or more session keys are used by the first AP to establish a communication session with the subscriber station; and
   generating, by the first AP, a second key name, a third key name, and a fourth key name associated with the first second-level PMK, the second second-level PMK, and the third second-level PMK, respectively;
   wherein each of the second key name, the third key name, and the fourth key name includes at least in part the first key name and an address of the subscriber station.

2. The method of claim 1, further comprising:
   generating a plurality of key names, at least one of the plurality of key names corresponding to one of the plurality of second-level derived authentication keys.

3. A method as defined in claim 2, wherein generating the plurality of key names comprises generating at least one of the plurality of key names based on at least one of a hash function, a service set identifier, a network access server identifier, a separator, or a sender protocol address.

4. A method as defined in claim 1, wherein generating the plurality of second-level derived authentication keys comprises generating a second-level PMK based on at least one of the first-level PMK, a key derivation function, a service set identifier, a network access server identifier, a separator, or a sender protocol address.

5. A method as defined in claim 1, further comprising:
   generating the first key name.

6. A method as defined in claim 1 further comprising:
   generating the first-level PMK based on at least one of a master secret key, a service set identifier, a mobility domain identifier, a network access server identifier, a separator, or a sender protocol address; and
   generating a key name corresponding to the first-level PMK based on at least one of the service set identifier, the mobility domain identifier, the network access server identifier, the separator, the sender protocol address, or a nonce value.

7. A method as defined in claim 1, further comprising receiving the first-level PMK and a key name from an authentication server, wherein the key name corresponds to the first-level PMK.

8. A method as defined in claim 1, further comprising:
   generating a session key for a session with the subscriber station based on one of the plurality of second-level derived authentication keys; and
   generating a key name corresponding to the session key.

9. A method as defined in claim 1, further comprising:
   generating a pairwise temporal key based on at least one of: (A) one of the second plurality of second-level derived authentication keys, (B) a key derivation function, (C) a first nonce value, (D) a second nonce value, (E) a first network access server identifier, (F) a second network access server identifier, (G) a basic service set identifier, or (H) a sender protocol address; and
   generating a key name corresponding to the pairwise temporal key based on at least one of a secure hash function, the first nonce value, the second nonce value, the basic service set identifier, or the sender protocol address.

10. The method of claim 1, wherein the second key name, the third key name, and the fourth key name includes at least in part identifications of the first AP, the second AP, and the third AP, respectively.

11. An apparatus comprising:
    an antenna to communicatively couple the apparatus to a wireless network;
    a first network access server to generate a plurality of second-level derived authentication keys based on a first-level pairwise master key (PMK), the plurality of second-level derived authentication keys including a first second-level PMK, a second second-level PMK, and a third second-level PMK being associated with the first network access server, a second network access server, and a third network access server, respectively, wherein a first key name is associated with the first-level PMK;
    a key name generator coupled to the first network access server to generate a second key name, a third key name, and a fourth key name associated with the first second-level PMK, the second second-level PMK, and the third second-level PMK, respectively, wherein each of the second key name, the third key name, and the fourth key name includes at least in part the first key name and an address of a subscriber station, and an authenticator to generate a session key for a session between the apparatus and the subscriber station based on the first second-level PMK;

wherein the first, second and third network access servers are associated with a plurality of network access servers of a mobility domain.

12. An apparatus as defined in claim 11, wherein the first network access server generates the first-level PMK based on a master authentication key received from an authentication server, and wherein the key name generator generates a key name corresponding to the first-level PMK.

13. An apparatus as defined in claim 11, wherein the first network access server receives the first-level PMK and a key name from an authentication server, and wherein the key name corresponds to the first-level PMK.

14. An apparatus as defined in claim 11 further comprising a communication interface to securely forward the second second-level PMK to the second network access server.

15. An apparatus as defined in claim 11, wherein the first network access server is integrated within a controller of at least one of an access point or a base station.

16. A system comprising:

an omni-directional antenna; and a processor coupled to the omni-directional antenna to generate a plurality of second-level derived authentication keys at a first network access server of a mobility domain based on a first-level pairwise master key (PMK) and to generate a plurality of key names, wherein a first key name is associated with the first-level PMK, wherein the plurality of second-level derived authentication keys includes a first second-level PMK, a second second-level PMK, and a third second-level PMK associated with the first network access server, a second network access server, and a third network access server, respectively, wherein the first second-level PMK is used by the first network access server to establish a communication session with a subscriber station, wherein a second key name, a third key name, and a fourth key name are associated with the first second-level PMK, the second second-level PMK, and the third second-level PMK, respectively, wherein each of the second key name, the third key name, and the fourth key name includes at least in part the first key name and an address of the subscriber station, and wherein at least one of the plurality of key names corresponds to one of the plurality of second-level derived authentication keys.

17. A system as defined in claim 16, wherein the processor generates the first-level PMK based on a master authentication key received from an authentication server, and generates a key name corresponding to the first-level PMK.

18. A system as defined in claim 16, wherein the processor receives the first-level PMK and a key name from an authentication server, and wherein the key name corresponds to the first-level PMK.

19. A system as defined in claim 16, wherein the processor generates a session key for a session with a subscriber station based on one of the plurality of second-level derived authentication keys, and generates a key name corresponding to the session key.

* * * * *